(12) United States Patent
Higano

(10) Patent No.: US 8,054,427 B2
(45) Date of Patent: Nov. 8, 2011

(54) LIQUID CRYSTAL DISPLAY DEVICE

(75) Inventor: Toshiyuki Higano, Ishikawa-gun (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 592 days.

(21) Appl. No.: 12/189,850

(22) Filed: Aug. 12, 2008

(65) Prior Publication Data
US 2009/0091696 A1    Apr. 9, 2009

(30) Foreign Application Priority Data
Oct. 5, 2007  (JP) ................. 2007-262529

(51) Int. Cl.
*G02F 1/1337* (2006.01)
(52) U.S. Cl. ......... 349/129; 349/126; 349/106; 349/139
(58) Field of Classification Search .......... 349/141, 349/106, 123, 126, 129, 139
See application file for complete search history.

(56) References Cited

U.S. PATENT DOCUMENTS

| 6,456,351 B1* | 9/2002 | Kim et al. | 349/141 |
| 6,646,707 B2* | 11/2003 | Noh et al. | 349/141 |
| 2005/0105034 A1* | 5/2005 | Ono et al. | 349/143 |

FOREIGN PATENT DOCUMENTS

| JP | 2005-107535 | 4/2005 |
| JP | 2006-139295 | 6/2006 |

OTHER PUBLICATIONS

U.S. Appl. No. 12/396,666, filed Mar. 3, 2009, Higano, et al.

* cited by examiner

*Primary Examiner* — Thoi Duong
(74) *Attorney, Agent, or Firm* — Oblon, Spivak, McClelland, Maier & Neustadt, L.L.P.

(57) ABSTRACT

A liquid crystal display device, which is configured to have a liquid crystal layer held between a pair of substrates, includes a display area including a red color pixel, a green color pixel and a blue color pixel, a pixel electrode which is disposed in each of the color pixels, a counter-electrode which is opposed to the pixel electrode via an interlayer insulation film, and an alignment film which is disposed in contact with the liquid crystal layer and is subjected to such rubbing treatment as to restrict alignment of liquid crystal molecules included in the liquid crystal layer. The pixel electrode has a slit which is formed to be inclined with respect to a direction of rubbing of the alignment film, and the slit of the red pixel and the slit of the blue pixel are formed to be inclined in different directions.

9 Claims, 10 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2007-262529, filed Oct. 5, 2007, the entire contents of which are incorporated herein by reference.

BACKGROUND OF THE INVENTION

1. Field of the Invention

The present invention relates generally to a liquid crystal display device, and more particularly to a liquid crystal display device which is configured to have a pixel electrode and a counter-electrode on one of substrates that constitute a liquid crystal display panel.

2. Description of the Related Art

In recent years, flat-panel display devices have vigorously been developed, and liquid crystal display device, above all, have attracted attention because of advantages of light weight, small thickness and low power consumption. In particular, in an active matrix liquid crystal display device in which a switching element is provided in each of pixels, attention has been paid to the structure which makes use of a transverse electric field (including a fringe electric field) of an IPS (In-Plane Switching) mode or an FFS (Fringe Field Switching) mode (see, for instance, Jpn. Pat. Appln. KOKAI Publication No. 2005-107535 and Jpn. Pat. Appln. KOKAI Publication No. 2006-139295).

The liquid crystal display device of the IPS mode or FFS mode includes a pixel electrode and a counter-electrode which are formed on an array substrate, and liquid crystal molecules are switched by a transverse electric field that is substantially parallel to the major surface of the array substrate. In addition, polarizer plates, which are disposed such that their axes of polarization intersect at right angles, are disposed on the outer surfaces of the array substrate and the counter-substrate. By this disposition of the polarizer plates, a black screen is displayed, for example, at a time of non-application of voltage, and a white screen is displayed, as the light transmittance (modulation ratio) gradually increases with the application of a voltage corresponding to a video signal to the pixel electrode. In this liquid crystal display device, since the liquid crystal molecules rotate in a plane that is substantially parallel to the major surface of the substrate, the polarization state is not greatly affected by the direction of incidence of transmissive light. Thus, this liquid crystal display device has such features as a low viewing angle dependency and a wide viewing angle.

In this liquid crystal display device of the IPS mode or FFS mode, when a white screen is displayed, a color hue variation may occur, in some cases, in relation to the viewing angle. As a result, the display quality of the liquid crystal display device may deteriorate.

BRIEF SUMMARY OF THE INVENTION

The present invention has been made in consideration of the above-described problem, and the object of the invention is to provide a liquid crystal display device which can display an image with good display quality, while suppressing a color hue variation in relation to viewing angles.

According to an aspect of the present invention, there is provided a liquid crystal display device which is configured to have a liquid crystal layer held between a pair of substrates, comprising: a display area including a first color pixel and a second color pixel, which display different colors; a pixel electrode which is disposed in each of the first color pixel and the second color pixel; a counter-electrode which is disposed on the same substrate as the pixel electrode and is opposed to the pixel electrode; and an alignment film which is disposed in contact with the liquid crystal layer and is subjected to such rubbing treatment as to restrict alignment of liquid crystal molecules included in the liquid crystal layer, wherein the liquid crystal molecules in the first color pixel and the second color pixel are aligned in different directions in a state in which an electric field is generated between the pixel electrode and the counter-electrode.

The present invention can provide a liquid crystal display device which can display an image with good display quality, while suppressing a color hue variation in relation to viewing angles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to an embodiment of the present invention will now be described with reference to the accompanying drawings.

A liquid crystal display device of an FFS mode is described below as an example of a liquid crystal display device of a liquid crystal mode in which a pixel electrode and a counter-electrode are provided on one of substrates and liquid crystal molecules are switched by using a transverse electric field that is generated between the substrates.

Figure 1:
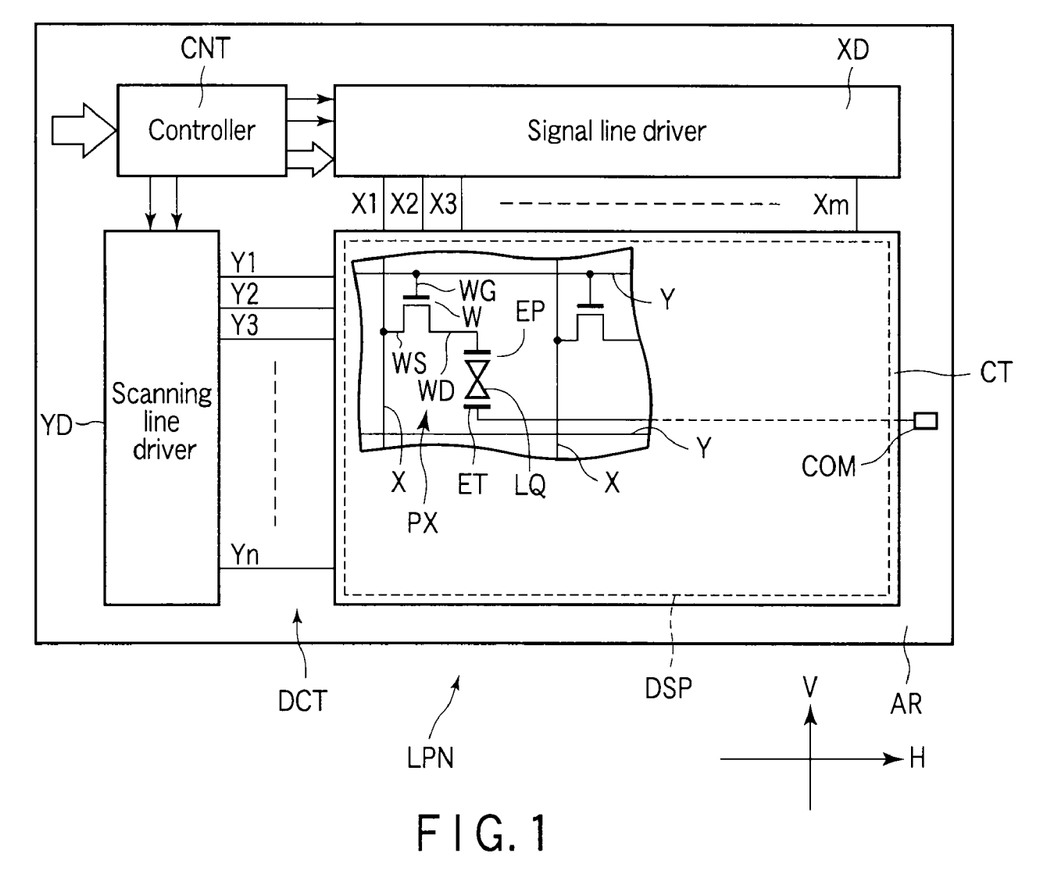
FIG. 1 schematically shows the structure of a liquid crystal display device of a liquid crystal mode which makes use of a transverse electric field according to an embodiment of the present invention.
Figure 2A:
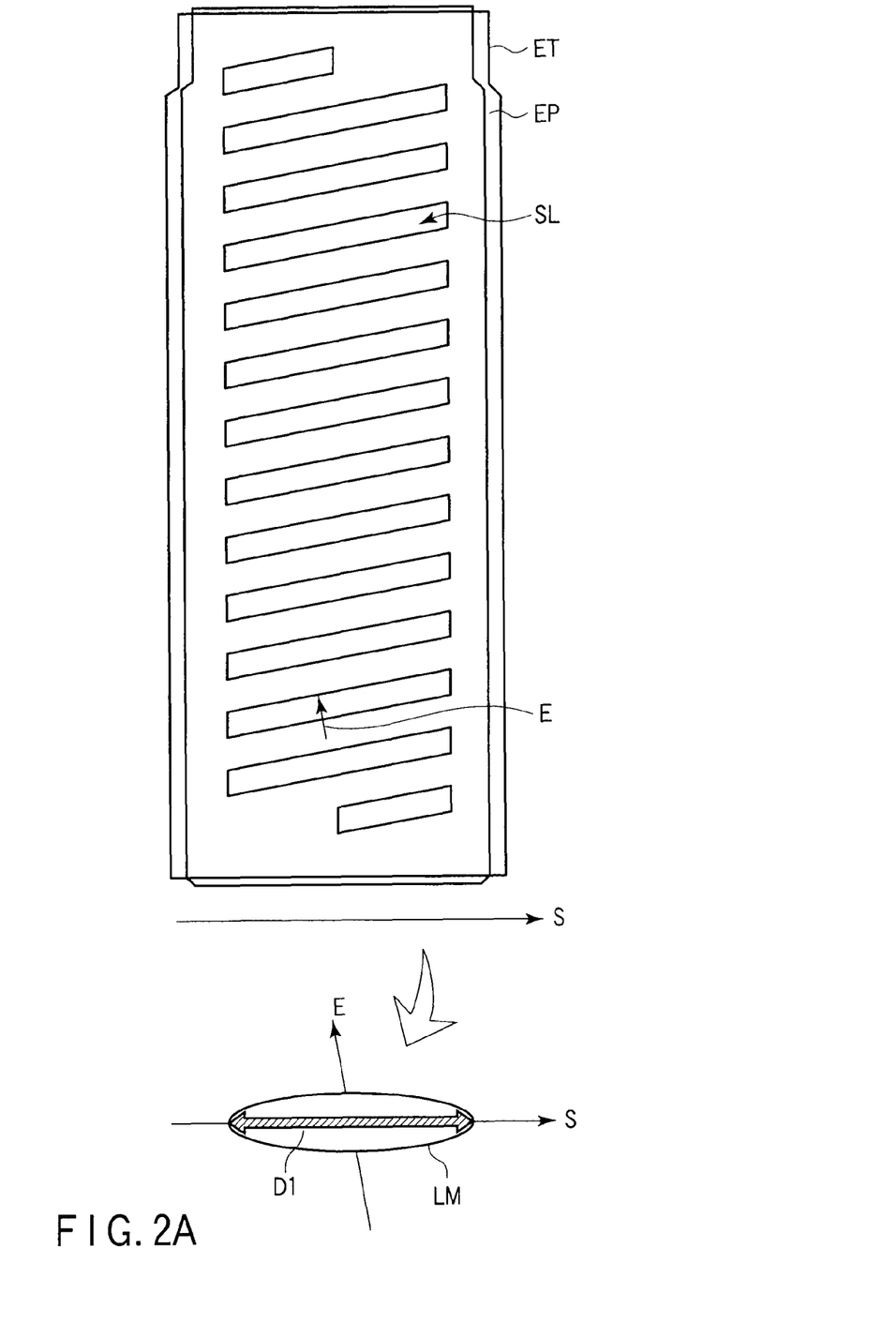
FIG. 2A is a plan view that schematically shows the structure of one pixel of an array substrate, which is applied to the liquid crystal display device shown in FIG. 1.
Figure 2B:
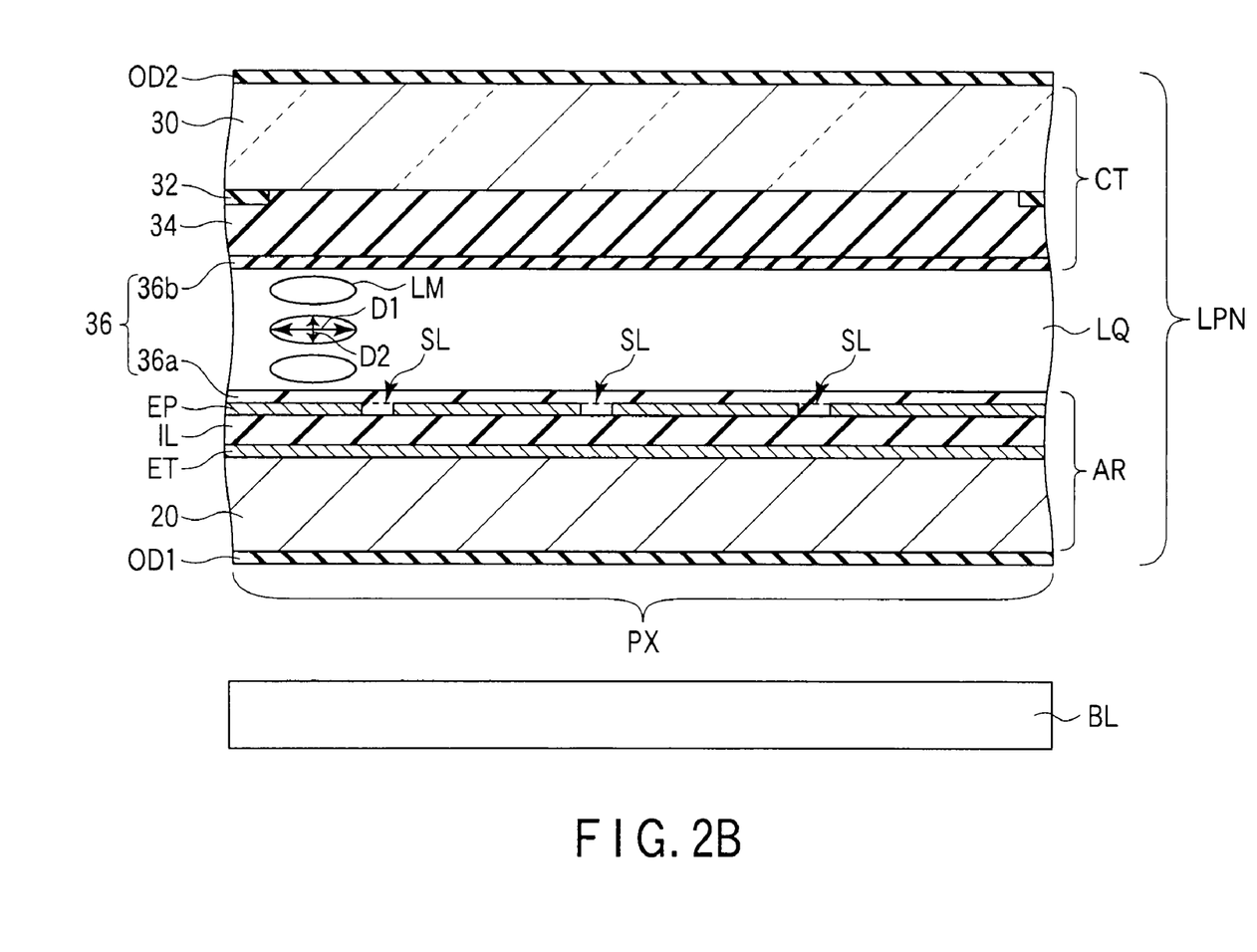
FIG. 2B is a cross-sectional view that schematically shows the structure of the array substrate and a counter-substrate, which are applied to the liquid crystal display device shown in FIG. 1.

As is shown in FIG. 1, FIG. 2A and FIG. 2B, the liquid crystal display device is an active matrix type liquid crystal display device, and includes a liquid crystal display panel LPN. The liquid crystal display panel LPN includes a pair of substrates, namely, an array substrate AR and a counter-substrate CT which is disposed to be opposed to the array substrate AR. Further, the liquid crystal display panel LPN includes a liquid crystal layer LQ which is held between the array substrate AR and the counter-substrate CT. This liquid crystal display device includes a display area DSP which displays an image. The display area DSP is composed of a plurality of color pixels PX which are arrayed in a matrix of m×n.

The array substrate AR is formed by using an insulating substrate 20 with light transmissivity, such as a glass plate or a quartz plate. Specifically, the array substrate AR includes, in the display area DSP, an (m×n) number of pixel electrodes EP which are disposed in association with the respective color pixels PX; an n-number of scanning lines Y (Y1 to Yn) which extend in a row direction H of the color pixels PX; an m-number of signal lines X (X1 to Xn) which extend in a column direction V of the color pixels PX; an (m×n) number of switching elements W which are disposed in regions including intersections of the scanning lines Y and signal lines X in the respective color pixels PX; and a counter-electrode ET which is disposed to be opposed to the pixel electrodes EP via an interlayer insulation film IL.

The array substrate AR further includes, in a driving circuit region DCT around the display area DSP, at least a part of a scanning line driver YD which is connected to the n-number of scanning lines Y, and at least a part of a signal line driver XD which is connected to the m-number of signal lines X. The scanning line driver YD successively supplies a scanning signal (driving signal) to the n-number of scanning lines Y on the basis of the control by a controller CNT. The signal line driver XD supplies video signals (driving signals) to the m-number of signal lines X on the basis of the control by the controller CNT at a timing when the switching elements W of each row are turned on by the scanning signal. Thereby, the pixel electrodes EP of each row are set at pixel potentials corresponding to the video signals that are supplied via the associated switching elements W.

Each of the switching elements W is composed of, e.g. a thin-film transistor. The semiconductor layer of the switching element W can be formed of, e.g. polysilicon or amorphous silicon. A gate electrode WG of the switching element W is connected to the scanning line Y (or formed integral with the scanning line Y). A source electrode WS of the switching element W is connected to the signal line X (or formed integral with the signal line X) and is put in contact with a source region of the semiconductor layer. A drain electrode WD of the switching element W is connected to the pixel electrode EP (or formed integral with the pixel electrode EP) and is put in contact with a drain region of the semiconductor layer.

The counter-electrode ET is disposed, for example, in an insular shape in each of the color pixels PX, and is connected to a common wiring line COM to which a common potential is supplied. The counter-electrode ET is covered with the interlayer insulation film IL. The pixel electrode EP is disposed on the interlayer insulation film IL so as to be opposed to the counter-electrode ET. The pixel electrode EP is provided with a plurality of slits SL which are opposed to the counter-electrode ET. The pixel electrode EP and counter-electrode ET are formed of a light-transmissive electrically conductive material such as indium tin oxide (ITO) or indium zinc oxide (IZO). The pixel electrodes EP corresponding to all color pixels PX are covered with an alignment film 36a.

On the other hand, the counter-substrate CT is formed by using an insulating substrate 30 with light transmissivity, such as a glass plate or a quartz plate. Specifically, in a color-display-type liquid crystal display device, as shown in FIG. 2B, the counter-substrate CT includes a black matrix 32, which divides the color pixels PX, on an inner surface of the insulating substrate 30, that is, a surface opposed to the liquid crystal layer LQ, and a color filter layer 34 which is disposed in each color pixel PX which is surrounded by the black matrix 32. In addition, the counter-substrate CT may be configured to include a shield electrode for reducing the effect of an external electric field, and an overcoat layer which is disposed with such a relatively large film thickness as to planarize irregularities on the surface of the color filter layer 34.

The black matrix 32 is disposed on the insulating substrate 30 so as to be opposed to the scanning lines Y and signal lines X and wiring portions of the switching elements W, etc., which are provided on the array substrate AR. The color filter layer 34 is disposed on the insulating substrate 30 and is formed of color resins of different colors, for example, the three primary colors of red, blue and green. The red color resin, blue color resin and green color resin are disposed in association with the color pixels PX of red, blue and green, respectively. The color filter layer 34 is covered with an alignment film 36b. Specifically, the alignment films 36a and 36b are disposed in contact with the liquid crystal layer LQ.

When the above-described counter-substrate CT and array substrate AR are disposed such that their alignment films 36a and 36b are opposed to each other, a predetermined gap is created by spacers (not shown) which are disposed therebetween. The liquid crystal layer LQ is formed of a liquid crystal composition including liquid crystal molecules LM which are sealed in the gap between the alignment film 36a of the array substrate AR and the alignment film 36b of the counter-substrate CT. The liquid crystal molecules LM included in the liquid crystal layer LQ are aligned by restriction forces that are arise from the alignment film 36a and alignment film 36b. Specifically, at a time of no electric field, that is, when there is no potential difference between the potential of the pixel electrode EP and the potential of the counter-electrode ET (i.e. when no electric field is generated between the pixel electrode EP and the counter-electrode ET), the liquid crystal molecules LM are aligned such that their major-axis direction D1 is parallel to a rubbing direction S of the alignment film 36a and alignment film 36b.

The liquid crystal display device includes an optical element OD1 which is provided on one of outer surfaces of the liquid crystal display panel LPN (i.e. that surface of the array substrate AR, which is opposite to the surface thereof that is in contact with the liquid crystal layer LQ), and an optical element OD2 which is provided on the other outer surface of the liquid crystal display panel LPN (i.e. that surface of the counter-substrate CT, which is opposite to the surface thereof that is in contact with the liquid crystal layer LQ). Each of the optical elements OD1 and OD2 includes a polarizer plate, and, for example, a normally black mode, in which the transmittance of the liquid crystal panel LPN decreases to a minimum (i.e. a black screen is displayed) at the time of no electric field, is realized.

Further, the liquid crystal display device includes a backlight unit BL which is disposed on the array substrate AR side of the liquid crystal display panel LPN.

In this liquid crystal display device, as shown in FIG. 2A, when a potential difference is generated between the potential of the pixel electrode EP and the potential of the counter-electrode ET (i.e. at a voltage application time when a voltage of a potential different from a common potential is applied to the pixel electrode EP), an electric field E is generated between the pixel electrode EP and the counter-electrode ET. At this time, the liquid crystal molecule LM is driven such that its major-axis direction D1 is oriented from the rubbing direction S to a direction parallel to the electric field E. If the major-axis direction D1 of the liquid crystal molecule LM varies from the rubbing direction, the modulation ratio relating to the light passing through the liquid crystal layer LQ varies. Accordingly, part of backlight, which emanates from the backlight unit BL and passes through the liquid crystal display panel LPN, passes through the second optical element OD2, and thus a white screen is displayed. In short, the transmittance (modulation ratio) of the liquid crystal display panel LPN varies depending on the magnitude of the electric field E. In the liquid crystal mode which makes use of a transverse electric field, the backlight is selectively transmitted in this manner, and an image is displayed.

The luminance of each color pixel PX varies depending on viewing angles. This phenomenon is explained with reference to diagrams shown in FIG. 3. For the purpose of convenience, an azimuth direction in a major surface of the array substrate AR, which is parallel to the rubbing direction S, is defined as an H axis, and an azimuth direction perpendicular to the H axis is defined as a V axis. It is assumed that an azimuth direction on the positive (+) axis of the H axis corresponds to 0° azimuth, an azimuth direction on the negative (−) axis of the H axis corresponds to 180° azimuth, an azimuth direction on the positive (+) axis of the V axis corresponds to 90° azimuth, and an azimuth direction on the negative (−) axis of the V axis corresponds to 270° azimuth.

Figure 3:
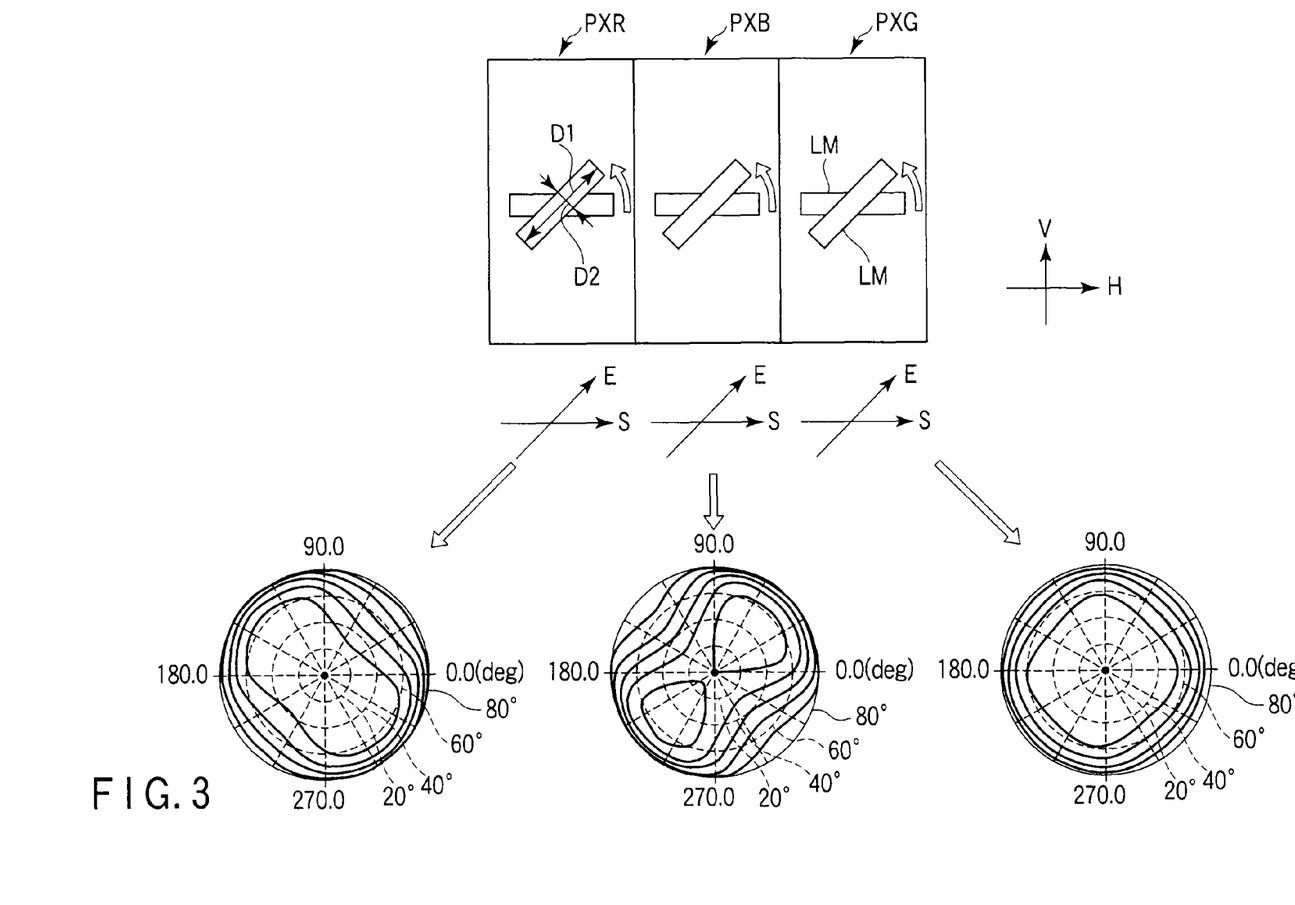
FIG. 3 is a view showing the relationship between alignment directions of liquid crystal molecules and luminance distributions.

In the example shown in FIG. 3, the rubbing direction S is the same in the respective color pixels PX, namely, a red pixel PXR, a blue pixel PXB and a green pixel PXG, and the rubbing direction S extends from 180° azimuth to 0° azimuth. In other words, at the time of no electric field, in each color pixel (PXR, PXB, PXG), the liquid crystal molecules LM are aligned such that their major-axis direction D1 is set at 0°-180° azimuth (i.e. a minor-axis direction D2 which is perpendicular to the major-axis direction D1 is set at 90°-270° azimuth). In each color pixel (PXR, PXB, PXG), when a voltage is applied and the electric field E is generated at 135° azimuth, the liquid crystal molecules LM are aligned such that their major-axis direction D1 is set at 135°-315° azimuth (i.e. the minor-axis direction D2 is set at 45°-225° azimuth).

In the state in which the electric field E is generated, the viewing angle dependency of luminance in each color pixel (PXR, PXB, PXG) is as shown in FIG. 3. In FIG. 3, the center corresponds to the normal direction of the liquid crystal display panel LPN. Concentric circles defined about the normal direction indicate tilt angles (viewing angles) to the normal direction, and correspond to 20°, 40°, 60° and 80°, respectively, from the inside. The characteristic diagrams in FIG. 3 are obtained by connecting regions of equal luminances in all directions.

In the example shown in FIG. 3, optimization is performed such that a substantially isotropic luminance distribution is obtained in the major-axis direction D1 and minor-axis direction D2 of the liquid crystal molecule LM in the green pixel PXG.

At this time, in the red pixel PXR, even if the viewing angle is increased in the minor-axis direction D2 (about 135°-315° azimuth) of the liquid crystal molecule LM, a relatively high luminance is obtained. In the example shown in FIG. 3, a high luminance is obtained up to the viewing angle of about 60°. On the other hand, in the red pixel PXR, if the viewing angle is increased in the major-axis direction D1 (about 45°-225° azimuth) of the liquid crystal molecule LM, the luminance sharply decreases.

In the blue pixel PXB, if the viewing angle is increased in the minor-axis direction D2 of the liquid crystal molecule LM, the luminance sharply decreases. On the other hand, in the blue pixel PXB, even if the viewing angle is increased in the major-axis direction D1 of the liquid crystal molecule LM, a relatively high luminance is obtained. In the example shown in FIG. 3, a high luminance is obtained up to the viewing angle of about 60°.

As has been described above, the variation of luminance in relation to the viewing angle in the major-axis direction D1 and minor-axis direction D2 of the liquid crystal molecule LM is different between the red pixel PXR, blue pixel PXB and green pixel PXG. In other words, even if an isotropic luminance distribution is obtained in the major-axis direction D1 and minor-axis direction D2 in the green pixel PXG, no isotropic luminance distribution is obtained in the major-axis direction D1 and minor-axis direction D2 in the red pixel PXR and blue pixel PXB. In addition, asymmetric luminance distributions are obtained between the red pixel PXR and blue pixel PXB.

Thus, as in the example shown in FIG. 3, in the case where a white screen is displayed on the liquid crystal display device that is configured such that the liquid crystal molecules are aligned in the same direction in all color pixels PX when the voltage is applied, if the viewing angle is increased in the 135°-315° azimuth direction (the minor-axis direction D2 of the liquid crystal molecule LM), the luminance in the red pixel PXR is high with little variation, while the luminance in the blue pixel PXB sharply varies and decreases. In addition, if the viewing angle is increased in the 45°-225° azimuth direction (the major-axis direction D1 of the liquid crystal molecule LM), the luminance in the red pixel PXR sharply varies and decreases, while the luminance in the blue pixel PXB is high with little variation.

Figure 4:
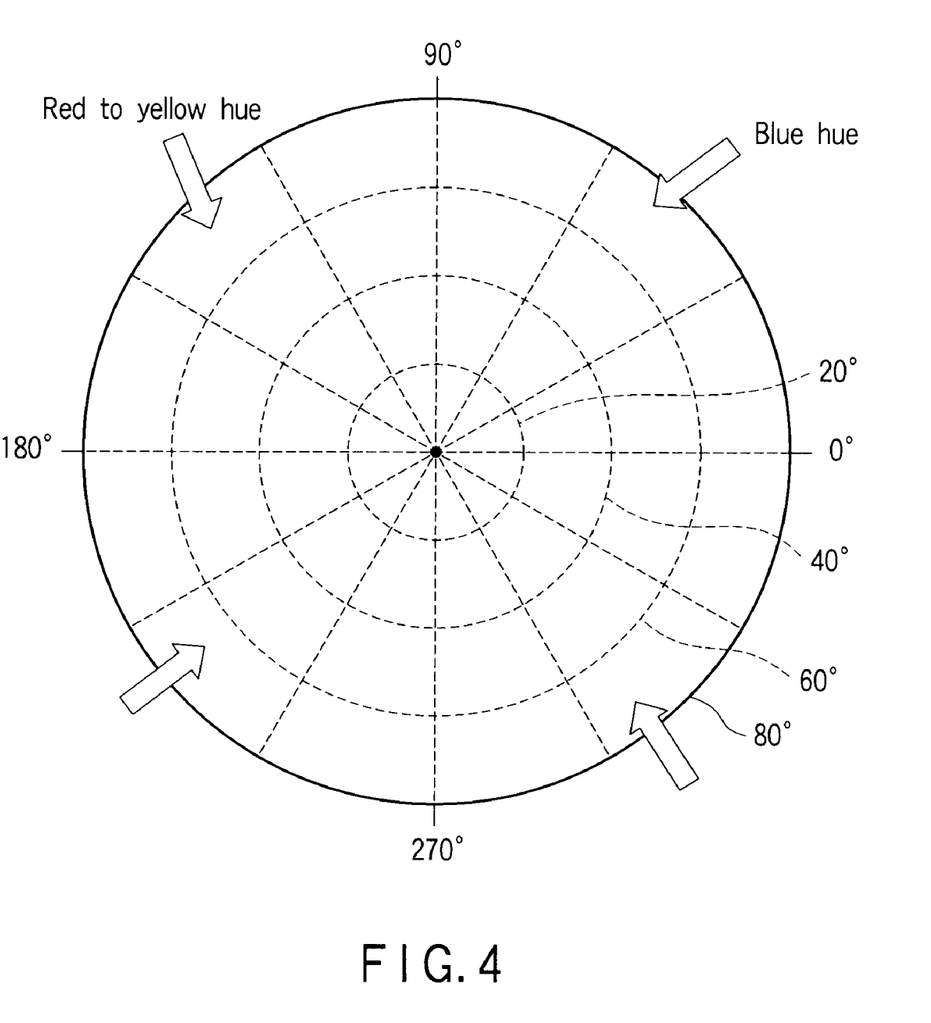
FIG. 4 shows a color hue variation in relation to viewing angles in the white screen display in the state in which the liquid crystal molecules are aligned in the same direction when a voltage is applied to color pixels of red, blue and green.

Specifically, as shown in FIG. 4, when the white screen is displayed, a red to yellow hue appears in accordance with the increase of the viewing angle in the 135°-315° azimuth direction, and a blue hue appears in accordance with the increase of the viewing angle in the 45°-225° azimuth direction. In short, when the white screen is displayed, a hue variation occurs depending on the viewing angle.

To cope with this problem, in the present embodiment, as regards a first color pixel and a second color pixel in which an isotropic luminance distribution is not obtained when a voltage is applied, the liquid crystal molecules LM of the first color pixel and the liquid crystal molecules LM of the second color pixel are configured to be aligned in different directions so that the luminance distributions in the first color pixel and the second color pixel may become equal. As in the example shown in FIG. 3, in the case where optimization is executed for the green pixel PXG, for instance, the red pixel PXR corresponds to the first color pixel, and the blue pixel PXB corresponds to the second color pixel. When a voltage is applied, the liquid crystal molecules of the red pixel PXR are aligned in a direction that is different from the alignment of the liquid crystal molecules of the blue pixel PXB. Thereby, matching is established between the luminance distribution in the red pixel PXR and the luminance distribution in the blue pixel PXB. Thus, it becomes possible to improve the color hue variation which depends on the viewing angle at the time when the white screen is displayed.

In the example shown in FIG. 3, in order to simply explain the phenomenon of the color hue variation in relation to the viewing angle, it was assumed that in all color pixels (PXR, PXG, PXB), the major-axis directions D1 of the liquid crystal molecules LM are aligned in the same direction when the voltage is applied, and that the luminance distribution at this time is conspicuously different between the major-axis direction D1 and minor-axis direction D2 of the liquid crystal molecules LM. In this example, such configuration is adopted that at the time of voltage application, the major-axis direction D1 of the liquid crystal molecule LM of the red pixel PXR that is the first color pixel substantially agrees with the minor-axis direction D2 of the liquid crystal molecule LM of the blue pixel PXB that is the second color pixel (or the minor-axis direction D2 of the liquid crystal molecule LM of the red pixel PXR substantially agrees with the major-axis direction D1 of the liquid crystal molecule LM of the blue pixel PXB). Thereby, in the red pixel PXR and blue pixel PXB, the variation of luminance in relation to the viewing angle becomes substantially equal. As a result, when the white screen is displayed, the color hue variation in relation to the viewing angle can be suppressed.

The above-described method of aligning the liquid crystal molecules LM is explained with reference to Example 1 and Example 2, which will be described below. In each of Example 1 and Example 2, it is assumed that the luminance distribution in relation to the viewing angle is optimized in the green pixel PXG.

Figure 5:
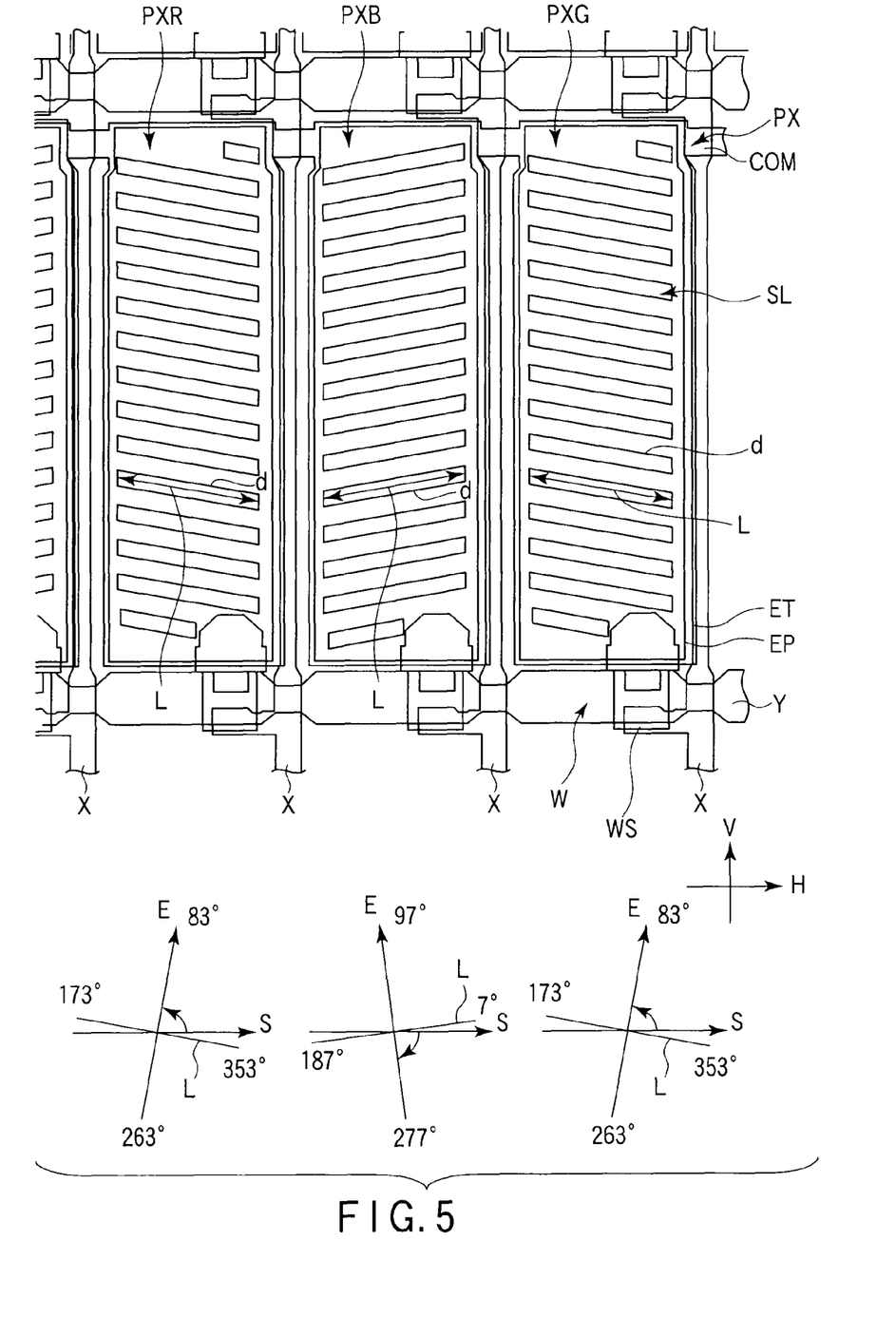
FIG. 5 is a plan view that schematically shows the structures of the pixel electrode and counter-electrode in each of the color pixels of red, blue and green in Example 1.
Figure 7:
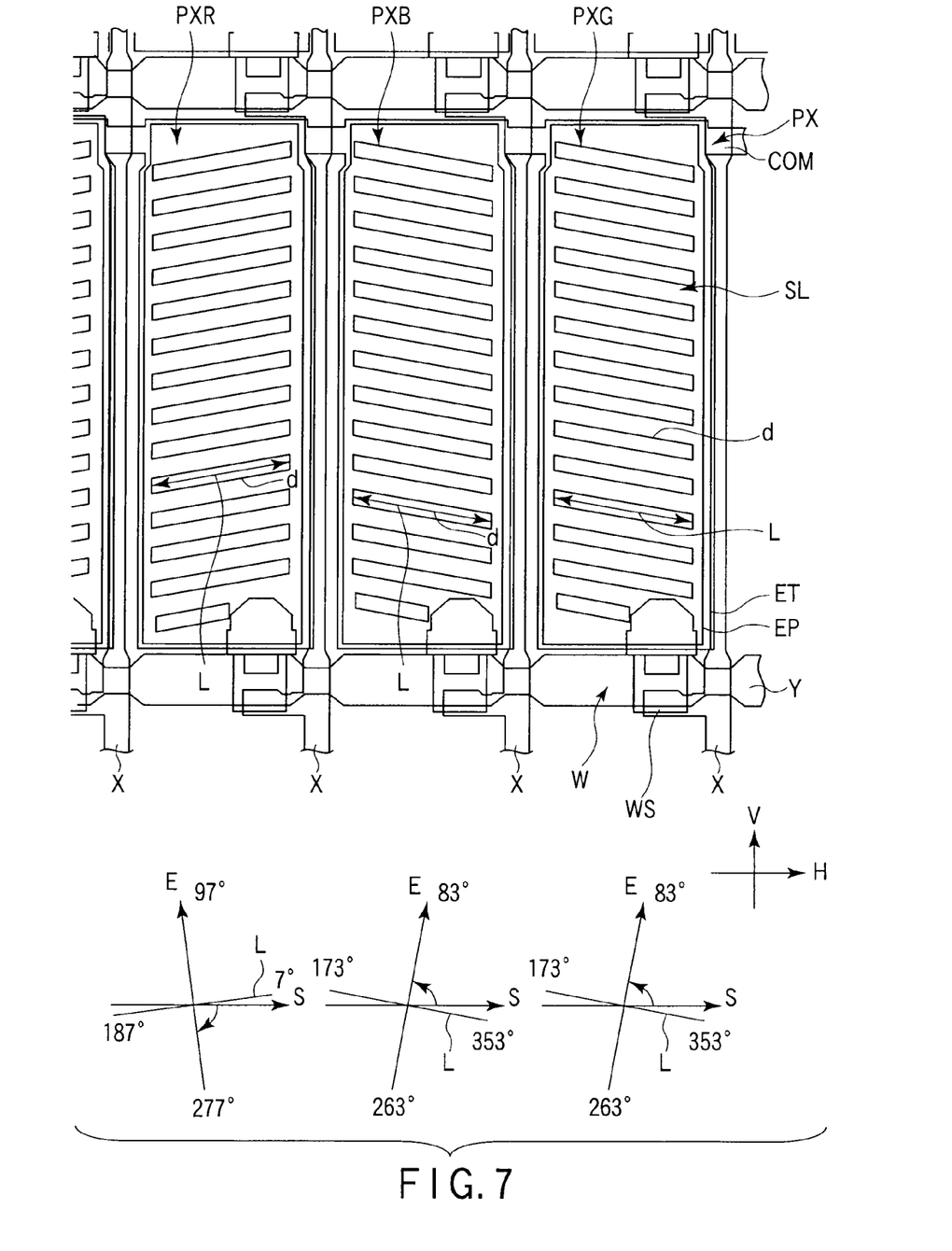
FIG. 7 is a plan view that schematically shows the structures of the pixel electrode and counter-electrode in each of the color pixels of red, blue and green in Example 2.

In each of Example 1 and Example 2, as shown in FIG. 5 and FIG. 7, the rubbing direction S is the same in each of the color pixels PX, and for example, is parallel to the row direction H. In addition, the pixel electrode EP of each color pixel PX has a plurality of slits SL. The slits SL are formed to be inclined with respect to the rubbing direction S of the alignment film 36a and alignment film 36b. Specifically, each slit SL is formed such that its major axis L is inclined with respect to the rubbing direction S of the alignment film 36a and alignment film 36b, and each slit SL is formed, for example, in a parallelogrammatic shape. A long side d of the slit L is parallel to the major axis L. A plurality of slits SL are arranged in a column direction V which is perpendicular to the rubbing direction S. The angle between the major axis L of the slit and the rubbing direction S is set at, e.g. 5° to 10°.

If such a voltage as to generate a potential difference between the pixel electrode EP and the counter-electrode ET is applied, an electric field E is generated through the slit SL in a direction perpendicular to the long side d. By this electric field E, the alignment direction of the liquid crystal molecules LM is changed from the rubbing direction S to the direction parallel to the electric field E. Specifically, the direction of the electric field E varies depending on the direction of the slit SL, and the alignment direction of the liquid crystal molecules LM at the time of voltage application can be controlled by the direction of the slit SL.

In Example 1, as shown in FIG. 5, in the red pixel PXR, each slit SL is formed, for example, such that its major axis L (i.e. long side d) becomes parallel to a 173°-353° azimuth direction in the screen (i.e. an azimuth direction at 7° clockwise from the rubbing direction S (or row direction H)). In the red pixel PXR having such slits SL, the electric field E is generated in a 83°-263° azimuth direction in the screen. Accordingly, the major-axis direction D1 of each liquid crystal molecule LM of the red pixel PXR rotates counterclockwise and is aligned in the 83°-263° azimuth direction in the screen.

In the blue pixel PXB, each slit SL is formed such that its major axis L (i.e. long side d) becomes parallel to a 7°-187° azimuth direction in the screen (i.e. an azimuth direction at 7° counterclockwise from the rubbing direction S). In the blue pixel PXB having such slits SL, the electric field E is generated in a 97°-277° azimuth direction in the screen. Accordingly, the major-axis direction D1 of each liquid crystal molecule LM of the blue pixel PXB rotates clockwise and is aligned in the 97°-277° azimuth direction in the screen.

In Example 1, in the green pixel PXG, each slit SL is formed such that its major axis L is set in the same direction as each slit SL of the red pixel PXR. Specifically, each slit SL is formed such that its major axis L becomes parallel to the 173°-353° azimuth direction in the screen. In the green pixel PXG having such slits SL, the electric field E is generated in the 83°-263° azimuth direction in the screen. Accordingly, the major-axis direction D1 of each liquid crystal molecule LM of the green pixel PXG rotates counterclockwise and is aligned in the 83°-263° azimuth direction in the screen.

Figure 6:
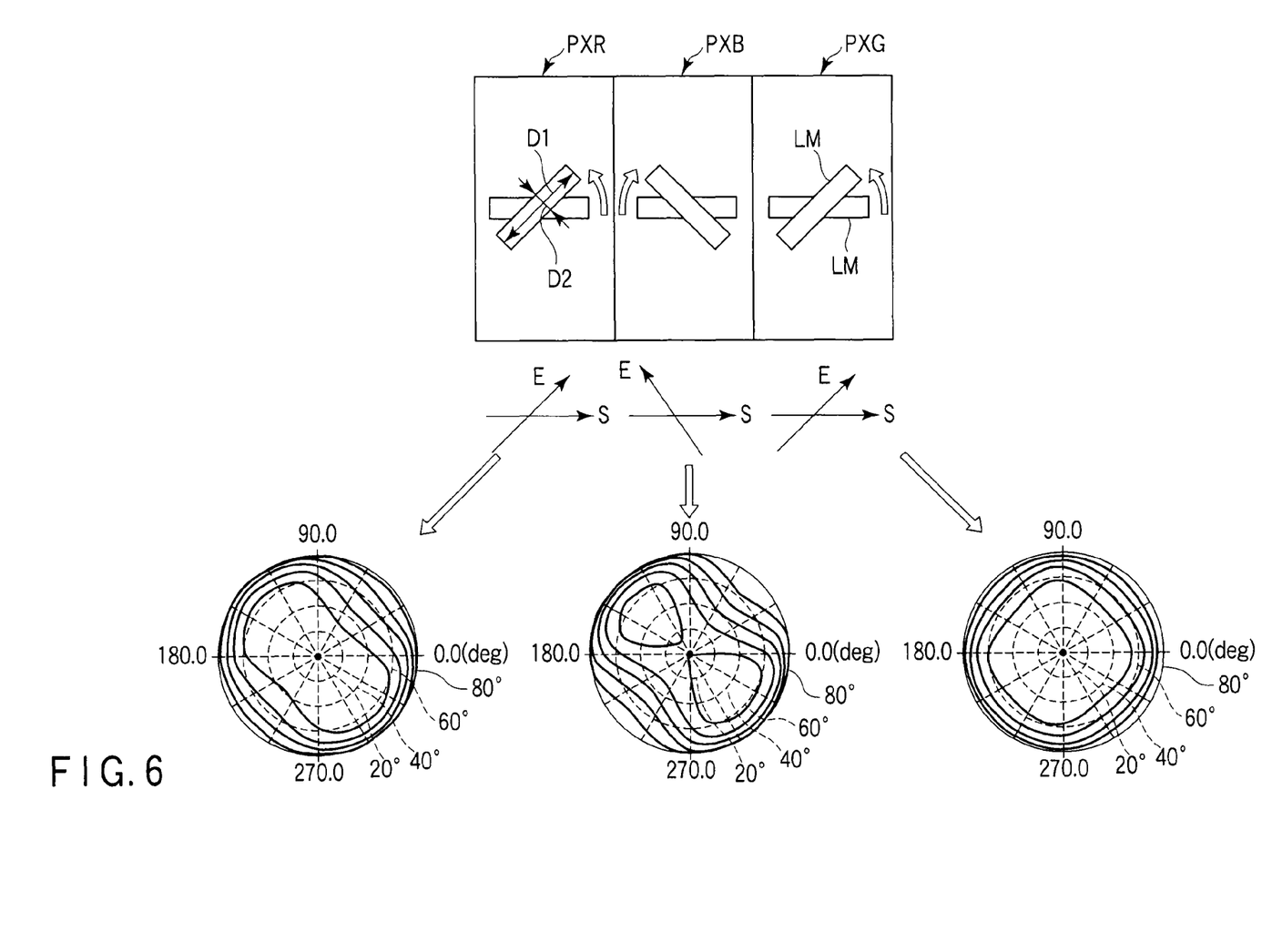
FIG. 6 is a view showing the alignment directions of liquid crystal molecules and luminance distributions in Example 1 shown in FIG. 5.

At this time, as shown in FIG. 6, the azimuth direction in which a variation in luminance of the red pixel PXR is small substantially agrees with the azimuth direction in which a variation in luminance of the blue pixel PXB is small. In other words, even if the viewing angle is increased from the normal direction toward the 135°-315° azimuth direction in the screen, the luminance is high in both the red pixel PXR and the blue pixel PXB, and the same degree of luminance variation occurs.

In addition, the azimuth direction in which a variation in luminance of the red pixel PXR is large substantially agrees with the azimuth direction in which a variation in luminance of the blue pixel PXB is large. In other words, if the viewing angle is increased from the normal direction toward the 45°-225° azimuth direction in the screen, the same degree of luminance variation occurs in both the red pixel PXR and the blue pixel PXB. Accordingly, in all directions in the screen, the luminance distribution in the red pixel PXR becomes substantially equal to the luminance distribution in the blue pixel PXB. Therefore, when the white screen is displayed, the color hue variation in relation to the viewing angle can be suppressed.

In Example 2, as shown in FIG. 7, in the red pixel PXR, each slit SL is formed, for example, such that its major axis L becomes parallel to a 7°-187° azimuth direction in the screen. In the red pixel PXR having such slits SL, the electric field E is generated in a 97°-277° azimuth direction in the screen. Accordingly, the major-axis direction D1 of each liquid crystal molecule LM of the red pixel PXR rotates clockwise and is aligned in the 97°-277° azimuth direction in the screen.

In the blue pixel PXB, each slit SL is formed such that its major axis L becomes parallel to a 173°-353° azimuth direction in the screen. In the blue pixel PXB having such slits SL, the electric field E is generated in a 83°-263° azimuth direction in the screen. Accordingly, the major-axis direction D1 of each liquid crystal molecule LM of the blue pixel PXB rotates counterclockwise and is aligned in the 83°-263° azimuth direction in the screen.

In Example 2, in the green pixel PXG, each slit SL is formed such that its major axis L is set in the same direction as each slit SL of the blue pixel PXB. Specifically, each slit SL is formed such that its major axis L becomes parallel to the 173°-353° azimuth direction in the screen. In the green pixel PXG having such slits SL, the electric field E is generated in the 83°-263° azimuth direction in the screen. Accordingly, the major-axis direction D1 of each liquid crystal molecule LM of the green pixel PXG rotates counterclockwise and is aligned in the 83°-263° azimuth direction in the screen.

Figure 8:
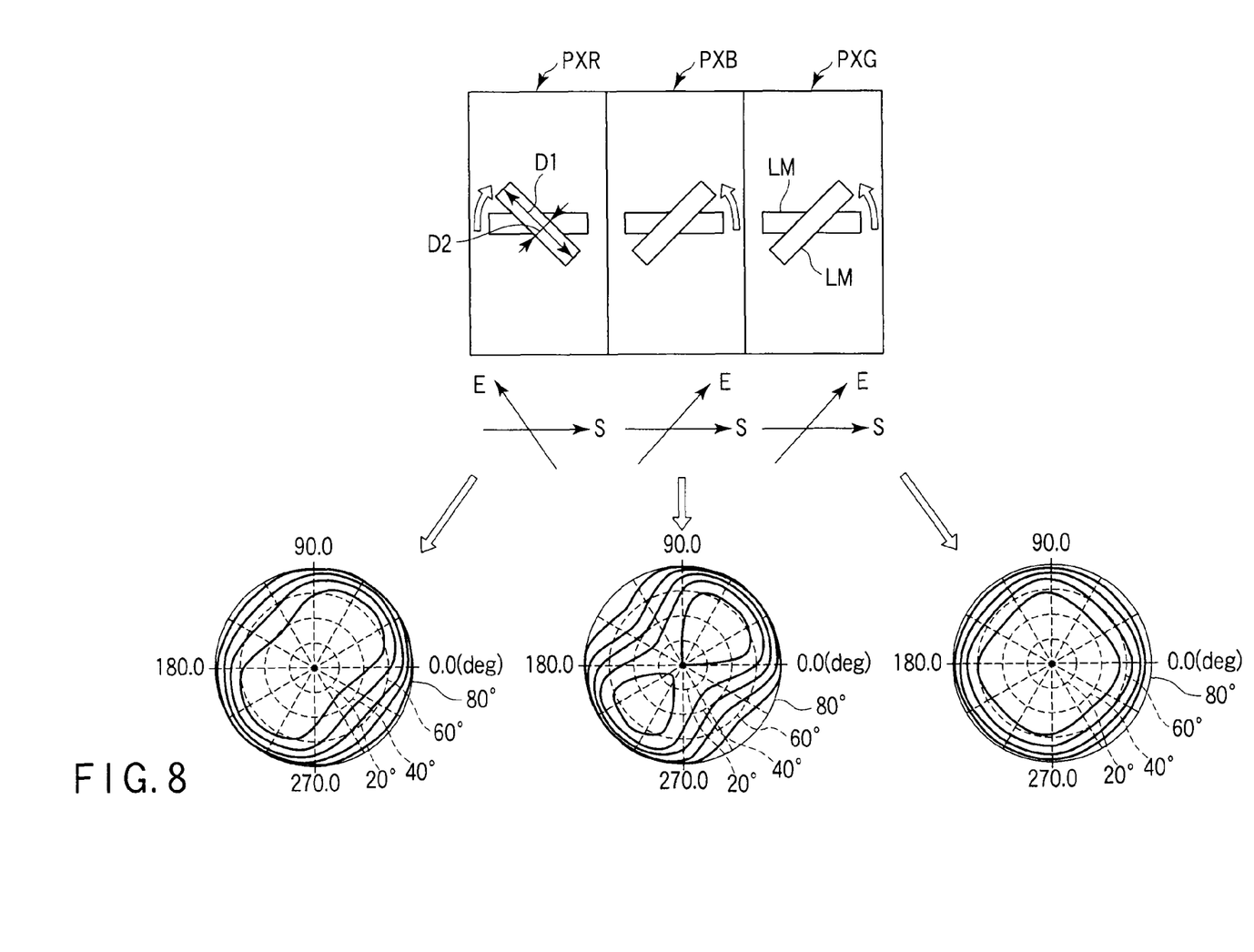
FIG. 8 is a view showing the alignment directions of liquid crystal molecules and luminance distributions in Example 2 shown in FIG. 7.

At this time, as shown in FIG. 8, the azimuth direction in which a variation in luminance of the red pixel PXR is small substantially agrees with the azimuth direction in which a variation in luminance of the blue pixel PXB is small. In other words, even if the viewing angle is increased from the normal direction toward the 45°-225° azimuth direction in the screen, the luminance is high in both the red pixel PXR and the blue pixel PXB, and the same degree of luminance variation occurs.

In addition, the azimuth direction in which a variation in luminance of the red pixel PXR is large substantially agrees with the azimuth direction in which a variation in luminance of the blue pixel PXB is large. In other words, if the viewing angle is increased from the normal direction toward the 135°-315° azimuth direction in the screen, the same degree of luminance variation occurs in both the red pixel PXR and the blue pixel PXB. Accordingly, in all directions in the screen, the luminance distribution in the red pixel PXR becomes substantially equal to the luminance distribution in the blue pixel PXB. Therefore, when the white screen is displayed, the color hue variation in relation to the viewing angle can be suppressed.

Figure 9:
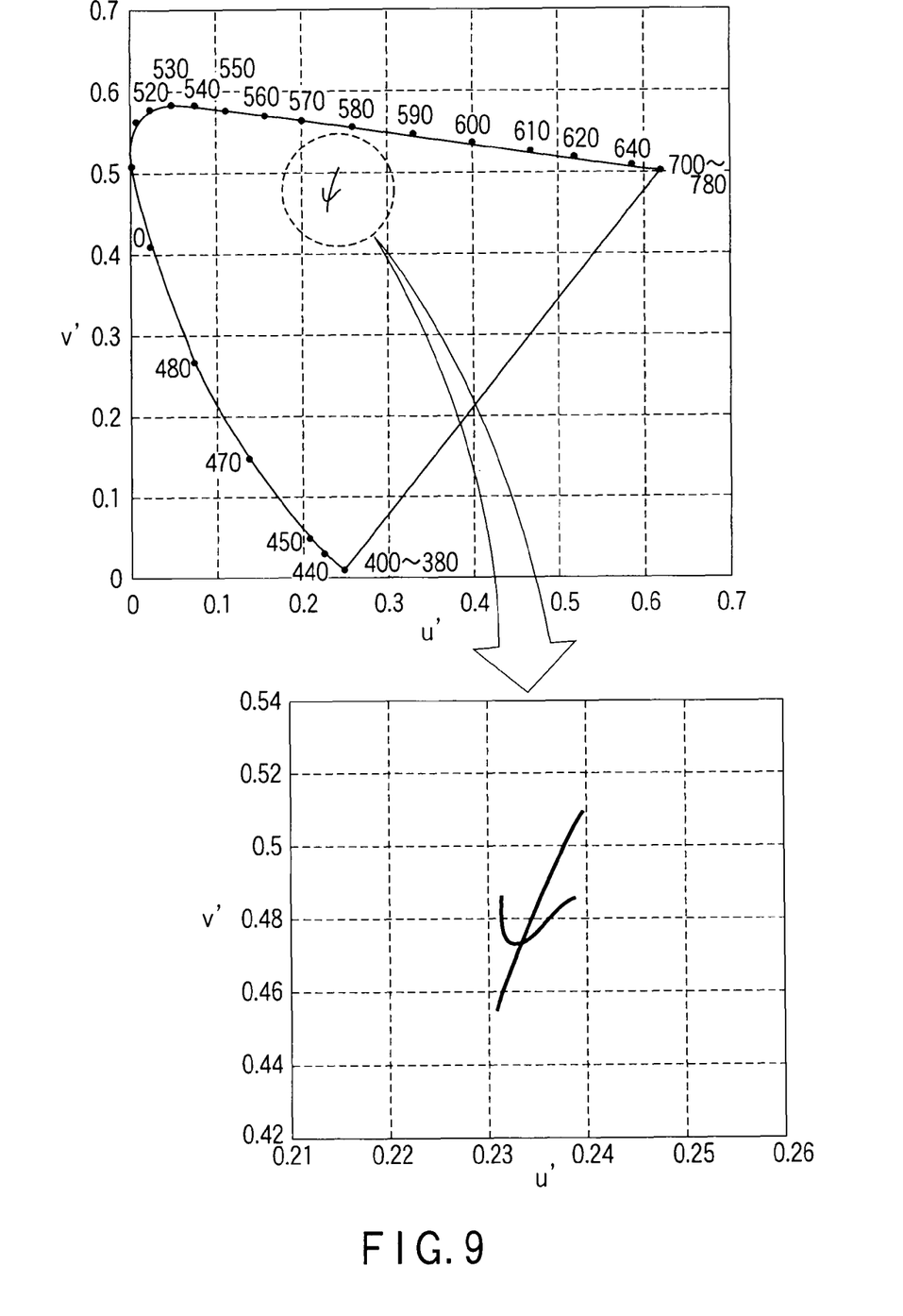
FIG. 9 shows a comparison result of a color hue variation in relation to viewing angles when white screens are displayed in Example 2 and a comparative example.

The color hue variation (color shift) depending on the direction of observation was verified. Specifically, the variation in chromaticity, which occurs in accordance with the increase of the viewing angle when a white screen is displayed, was measured. In the measurement, the CIE 1976 UCS chromaticity diagram was used, and FIG. 9 shows a measurement result of the chromaticity. The difference between the chromaticity, which is observed in the normal direction of the screen, and the chromaticity, which is observed at the viewing angle of 80° in each of the case where the viewing angle is increased from the normal direction toward the 45° and in the case where the viewing angle is increased from the normal direction toward the 135° azimuth direction, is expressed by $|\Delta v'|$ and $|\Delta u'|$.

In the case where the viewing angle is increased from the normal direction toward the 45° azimuth direction, $|\Delta v'|$ is 0.0199 and $|\Delta u'|$ is 0.0027 in a liquid crystal display device according to a comparative example in which the liquid crystal molecules LM in the red pixel PXR, blue pixel PXB and green pixel PXG are aligned in the same direction when the voltage is applied. On the other hand, $|\Delta v'|$ is 0.0121 and $|\Delta u'|$ is 0.002 in a liquid crystal display device in which the liquid crystal molecules LM are aligned in different directions between the red pixel PXR and the blue pixel PXB when the voltage is applied, as in Example 2.

In the case where the viewing angle is increased from the normal direction toward the 135° azimuth direction, $|\Delta v'|$ is 0.0355 and $|\Delta u'|$ is 0.0063 in the liquid crystal display device according to the comparative example. On the other hand, $|\Delta v'|$ is 0.0117 and $|\Delta u'|$ is 0.0055 in the liquid crystal display device according to Example 2.

It was hence confirmed that the values $|\Delta v'|$ and $|\Delta u'|$ are less in Example 2 than in the comparative example. In other words, it was understood that the color shift can be suppressed by adopting the structure in which the liquid crystal molecules are aligned in different directions between the red pixel PXR and the blue pixel PXB when the voltage is applied.

As has been described above, by setting the alignment directions of the liquid crystal molecules in accordance with the luminance distributions of the respective color pixels PX when the voltage is applied, it becomes possible to suppress a color hue variation in relation to viewing angles when a white screen is displayed, and to display an image with good display quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device which is configured to have a liquid crystal layer held between a pair of substrates, comprising:
   a display area including a red pixel, a green pixel, and a blue pixel;
   a pixel electrode which is disposed in each of the red, green and blue pixels;
   a counter-electrode which is opposed to the pixel electrode via an interlayer insulation film; and
   an alignment film which is disposed in contact with the liquid crystal layer and is subjected to such rubbing treatment as to restrict alignment of liquid crystal molecules included in the liquid crystal layer,
   wherein the pixel electrode includes a slit plurality of slits which are formed to be inclined with respect to a direction of rubbing of the alignment film and that have respective major axes,
   the major axes of the plurality of slits of the pixel electrode are parallel to a single azimuth direction, and
   a direction of the major axis of the slit of the plurality of slits of the pixel electrode of the red pixel is different from a direction of the major axis of the slit of the plurality of slits of the pixel electrode of the blue pixel.

2. The liquid crystal display device according to claim 1, wherein a direction of the major axis of the slit of the plurality of slits of the pixel electrode of the green pixel agrees with the direction of the major axis of the slit of the plurality of slits of the pixel electrode of the red pixel.

3. The liquid crystal display device according to claim 2, wherein a direction of rubbing of the alignment film is identical in the green pixel and the red pixel.

4. The liquid crystal display device according to claim 2, wherein liquid crystal molecules in the green pixel and the red pixel are aligned in identical directions in a state in which an electric field is generated between the pixel electrode and the counter-electrode.

5. The liquid crystal display device according to claim 1, wherein a direction of the major axis of the slit of the plurality of slits of the pixel electrode of the green pixel agrees with the direction of the major axis of the slit of the plurality of slits of the pixel electrode of the blue pixel.

6. The liquid crystal display device according to claim 5, wherein a direction of rubbing of the alignment film is identical in the green pixel and the blue pixel.

7. The liquid crystal display device according to claim 5, wherein liquid crystal molecules in the green pixel and the blue pixel are aligned in different directions in a state in which an electric field is generated between the pixel electrode and the counter-electrode.

8. The liquid crystal display device according to claim 1, wherein a direction of rubbing of the alignment film is identical in the red pixel and the blue pixel.

9. The liquid crystal display device according to claim 1, wherein liquid crystal molecules in the red pixel and the blue pixel are aligned in different directions in a state in which an electric field is generated between the pixel electrode and the counter-electrode.

* * * * *